3,036,900
ASPHALTENE FUEL CONTAINING POLYPROPYLENE

Earl M. Honeycutt, West Chester, Pa., assignor to Sun Oil Company, Philadelphia, Pa., a corporation of New Jersey
No Drawing. Filed Apr. 1, 1960, Ser. No. 19,171
5 Claims. (Cl. 44—25)

This invention relates to a process for the production of a solid hydrocarbon fuel. More specifically, it pertains to a method of blending deasphalter bottoms with polymer scrap to produce a solid hydrocarbon fuel, which has improved physical strength.

It has been the practice in the petroleum industry for many years to remove the asphaltic constituents from certain crude oil stocks to render them more suitable for further processing. Lubricant stocks and catalytic cracking stocks are greatly improved by this treating step. Briefly, the deasphalting process comprises feeding asphaltic residuum to a contact tank and treating the oil with a solvent. Two major groups of solvents are used; low molecular weight hydrocarbons and oxygenated compounds. Commercially, propane and furfural have proven to be the most effective. Countercurrent contact of the downwardly moving charge oil with upwardly moving liquid propane in a countercurrent treating tower has become a standard technique. Operating conditions in the countercurrent extractor depend upon the boiling range of the charge and the desired properties of the product. Top tower temperatures of 130–180° F. are normally used at a pressure range of 200–550 p.s.i. Propane to oil ratios of 2.5/1.0 to 15.0/1.0 by volume are used for treating heavy and low viscosity residue, respectively. So-called "severe" deasphalting conditions feature high pressures of 300 to 400 p.s.i.g. and temperatures consistent therewith of 140 to 180° F. and high solvent to oil ratios of 6 to 1 to 15 to 1.

It is to the asphalt produced utilizing severe conditions that applicant's process is directed. The bottoms product from severe deasphalting is in the form of a paste at 110° F. and flows very slowly. The usual procedure is to mix this asphalt with cutter stock which is at a temperature of about 400° F. flowing in a line adjacent to the deasphalter exit pipe. This mix is used as liquid fuel. If the deasphalter bottoms are allowed to cool to ambient temperature, a black coke-like solid results. This material can be crushed by moderate pressure applied by one's fingers. If an attempt were made to ship this material under conditions of vibration and shock, it would tend to disintegrate into a powder. The asphalt contains from 30 to 50% by volume asphaltenes and from 30 to 50% resins, the remainder being oil with the quantity of oil being less than 25%. The high asphaltene content and low oil content is the explanation for the highly frangible physical state of the asphalt.

Broadly speaking, the object of the present invention is to upgrade this asphalt to a physical state of relatively higher strength and shock resistance. More specifically, it is the object of this invention to blend the asphalt with polymer in a continuous process which produces an improved solid fuel.

A particular feature of this invention is the use of isotactic polypropylene which does not meet specifications. At the present time, no satisfactory commercial market has developed for these scrap materials. The polymer is added in amounts ranging from 7 to 15%. Less than 7% polymer does not provide suitable binding effect. Larger quantities of polymer may be used, but this is not necessary. The polymer may be in the form of a powder, granules or larger pieces or dissolved in a solvent. Scrap isotactic polypropylene having a molecular weight above 10,000 is suitable.

In practicing the invention, the deasphalter bottoms which flow from the unit at about 110° F. are heated to about 450° F. by any suitable means. The polymer is added and the mixture thoroughly blended with agitation. Temperature is maintained in excess of 400° F. Following the blending, the mixture is passed to extruding or molding apparatus to be formed into the desired shapes. The fuel product may be made in pellets, briquettes, blocks or slabs, depending on the shape desired. The nature of the asphalt-polymer blend is such that no special equipment is necessary and conventional molding and pressing equipment is used. The asphalt component of the fuel is prepared as follows:

Vacuum tower bottoms having a boiling range of 850 to 1030° F., an A.P.I. gravity of 12.3, a viscosity (SSU/210° F.) of 1620, a Ramsbottom carbon of 14.0 wt. percent, pentane insolubles of 7.8 wt. percent and soluble resins of 24.0% were deasphalted at severe conditions. The asphalt produced had a specific gravity at 60° F. of 1.072 to 1.107, a Conradson carbon of from 35.4 to 46.1 (wt. percent), pentane insolubles of from 28.2 to 56.1 (wt. percent), and soluble resins of from 20% to 51 (wt. percent). The properties of the asphalt were varied by adjusting pressure, temperature and propane to oil ratio. However, at room temperature, the asphalt produced under severe contacting conditions has little physical strength. The pressure of the fingers is sufficient to crush a lump to a powder. When handled, it leaves a sooty deposit on the hands.

The polymer may be added to the asphalt in powder or pellet form or it may be dissolved in a solvent.

The mixing of the asphalt and polymer may be accomplished by any suitable conventional means. Generally speaking, it is believed better technique to keep the asphalt at a temperature above 200° F. by means of heat exchange and pipe jacketing until the polymer is mixed in. If desired, the asphalt may be cooled and ground to a powder and mixed with polymer powder to obtain thorough mixing.

The effect of the addition of polypropylene was measured by means of comparing test discs formed in a Carver hydraulic press. The asphalt was ground to a powder and compressed at 6,000 lbs. for three minutes at about 155° F. The resulting test disc could be broken with gentle finger pressure. Breaking was accompanied by shattering. Next, 10% by weight of polypropylene powder was intimately mixed with the powdered asphalt and the mixture compressed at 6,000 lbs. for three minutes at about 155° F. The resulting test disc broke only with the application of great hand pressure and the break line had a conchoidal appearance with no shattering. The addition of polypropylene thus greatly improves the handling characteristics of the asphalt and makes it suitable for shipping under conditions of abrasion and shock.

I claim:

1. A solid fuel composition comprising asphalt obtained from a deasphalting process containing at least 30% asphaltenes and less than 20% oils blended with 7 to 15% solid isotactic polypropylene having a molecular weight of at least 10,000.

2. The process of making a solid hydrocarbon fuel comprising the steps of severely deasphalting a residual hydrocarbon charge stock, removing asphalt from the extractor, blending said asphalt with solid isotactic polypropylene having a molecular weight of at least 10,000, and forming the blended material into solid shapes.

3. The process according to claim 2 wherein the said asphalt contains from 30 to 50% by volume asphaltenes and from 30 to 50% resins, the remainder being oil.

4. The process of making a solid hydrocarbon fuel comprising the steps of severely propane deasphalting a residual hydrocarbon charge stock at a propane to oil ratio of at least 6 to 1, removing asphalt from the extractor, blending said asphalt with solid isotactic polypropylene having a molecular weight of at least 10,000 and forming the blended material into solid shapes.

5. The process according to claim 4 wherein the asphalt is removed from the deasphalter as a liquid and maintained at a temperature of at least 250° F. throughout the blending step.

References Cited in the file of this patent

UNITED STATES PATENTS

| | | |
|---|---|---|
| 2,370,060 | Mead | Feb. 20, 1945 |
| 2,563,265 | Parsons | Aug. 7, 1951 |
| 2,755,223 | Illman | July 17, 1956 |
| 2,911,384 | Thompson et al. | Nov. 3, 1959 |